US008235535B2

(12) United States Patent
Furumi

(10) Patent No.: US 8,235,535 B2
(45) Date of Patent: Aug. 7, 2012

(54) PROJECTOR AND CONTROL METHOD OF PROJECTOR

(75) Inventor: Yoshiyuki Furumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 12/628,337

(22) Filed: Dec. 1, 2009

(65) Prior Publication Data

US 2010/0141904 A1 Jun. 10, 2010

(30) Foreign Application Priority Data

Dec. 4, 2008 (JP) ................................ 2008-309412

(51) Int. Cl.
*G03B 21/20* (2006.01)

(52) U.S. Cl. ......................................... 353/85; 353/121

(58) Field of Classification Search .................... 353/30, 353/85, 87, 121; 348/E5.137, E5.139
See application file for complete search history.

(56) References Cited

U.S. PATENT DOCUMENTS 6,995,523 B2 2/2006 Haruna et al.
2005/0219467 A1 * 10/2005 Nomizo et al. ................ 353/30
2006/0139245 A1 * 6/2006 Sugiyama ...................... 345/60

FOREIGN PATENT DOCUMENTS

JP 2005-243381 A 9/2005

* cited by examiner

*Primary Examiner* — Kevin Pyo

(74) *Attorney, Agent, or Firm* — AdvantEdge Law Group, LLC

(57) ABSTRACT

A projector which modulates light emitted from a light source and projects the modulated light, includes: a light source drive device which includes a light source drive unit for driving the light source and a light source control unit for controlling operation of the light source drive unit; and a control unit which includes a first communication unit connected with the light source control unit and a second communication unit connected with the light source drive unit, and allows the light source control unit to control operation of the light source drive unit by outputting control command from the first communication unit. The control unit determines whether the control corresponding to the control command has been normally performed, and outputs control information from the second communication unit to control the light source drive unit when it is determined that the control has not been normally performed.

9 Claims, 5 Drawing Sheets

PROJECTOR AND CONTROL METHOD OF PROJECTOR

CROSS-REFERENCE

The present application claims priority from Japanese Patent Application No. 2008-309412 filed on Dec. 4, 2008, which is hereby incorporated by reference in its entirety.

BACKGROUND

Currently, various types of projector capable of forming images by modulating light emitted from a light source and projecting the images on a screen or the like, which projector particularly includes a microcomputer (calculation processing circuit) in a light source drive device (discharge lamp lighting device) for actuating the light source have been proposed, for example, with Japanese Patent Publication No. 2005-243381). According to these types of projector, a main control device of the projector performs various controls over the light source and obtains various information from the light source drive device with high accuracy through communication with the microcomputer of the light source drive device.

According to the projector having this structure, however, there is a possibility that communication between the control device and the microcomputer cannot be achieved in normal condition due to effect of external noise or the like, or that normal control over the light source drive device cannot be performed when unexpected faulty operation is caused by the microcomputer.

SUMMARY

Various embodiments may provide a projector and a control method of a projector capable of solving the problems described above.

A projector which modulates light emitted from a light source and projects the modulated light according to at least one embodiment of the disclosure includes: a light source drive device which includes a light source drive unit for driving the light source and a light source control unit for controlling operation of the light source drive unit; and a control unit which includes a first communication unit connected with the light source control unit and a second communication unit connected with the light source drive unit, and allows the light source control unit to control operation of the light source drive unit by outputting control command from the first communication unit. The light source control unit controls operation of the light source drive unit based on the control command and outputs response corresponding to control result to the control unit. The control unit determines whether the control corresponding to the control command has been normally performed based on the response, and outputs control information from the second communication unit to control the light source drive unit when it is determined that the control has not been normally performed.

According to this projector, for control over the light source drive unit, the control unit controls the light source drive unit by outputting control information from the second communication unit when the control corresponding to the control command outputted from the first communication unit, i.e., the control via the light source control unit is not conducted in normal condition. Thus, the control unit can allow the light source drive unit to perform normal operation even when abnormality is produced in communication between the control unit and the light source control unit, when faulty operation is caused by the light source control unit, or in other cases.

In the projector according to at least one embodiment of the disclosure, the projector further includes a notification unit which notifies occurrence of abnormality when the control corresponding to the control command is not normally performed.

According to this projector, the notification unit notifies that abnormality has been produced in the projector when the control corresponding to the control command is not normally performed. Thus, the user can recognize abnormal condition produced in the projector (condition that control corresponding to the control command is not normally performed).

In the projector according to at lest one embodiment of the disclosure, the light source drive unit outputs response corresponding to control result to the control unit when the light source drive unit is controlled by the control unit.

According to this projector, the light source drive unit outputs the response corresponding to the control result to the control unit when the light source drive unit is controlled by the control unit. Thus, the control unit can determine whether the direct control has been conducted in normal condition, and performs operations different according to the control result. For example, the contents of the message given to the user may be varied according to the case when the direct control has been normally executed and when the direct control has not been normally executed. Alternatively, the operation of the projector may be stopped only when the direct control is not normally performed.

In the projector according to at least one embodiment of the disclosure, communication between the first communication unit and the light source control unit is serial communication.

According to this projector, communication between the control unit and the light source control unit is serial communication. Thus, various controls can be performed over the light source, and detection results and the like can be obtained with high accuracy without using a number of wires between the control unit and the light source control unit.

A control method of a projector which includes an image projection unit for modulating light emitted from a light source and projecting the modulated light, alight source drive unit for driving the light source, and a light source control unit for controlling operation of the light source drive unit according to at least one embodiment of the disclosure includes: outputting control command to the light source control unit and allowing the light source control unit to control operation of the light source drive unit based on the control command; obtaining response corresponding to control result from the light source control unit; determining whether control corresponding to the control command has been normally performed based on the response; and controlling the light source drive unit by outputting control information to the light source drive unit when the control corresponding to the control command is not normally performed.

According to this control method of the projector, for control over the light source drive unit, the light source drive unit is controlled when the control corresponding to the control command, i.e., the control via the light source control unit is not conducted in normal condition. Thus, the light source drive unit can perform normal operation even when abnormality is produced in communication with the light source control unit (output of control command and acquisition of response), when faulty operation is caused by the light source control unit, or in other cases.

When the projector and the control method of the projector include a computer, the above embodiments may be provided by a program for offering the functions described therein, a recording medium which records the program in such a manner as to be readable by the computer, or in other forms. The recording medium may be various medium readable by the computer such as flexible disk, CD-ROM, magneto-optical disc, IC card, ROM cartridge, internal memory device of projector (memory such as RAM and ROM), external memory device of projector, and others.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

A projector which forms an image by modulating light emitted from a light source according to image information and projects the formed image on a projection surface is hereinafter described.

Figure 1:
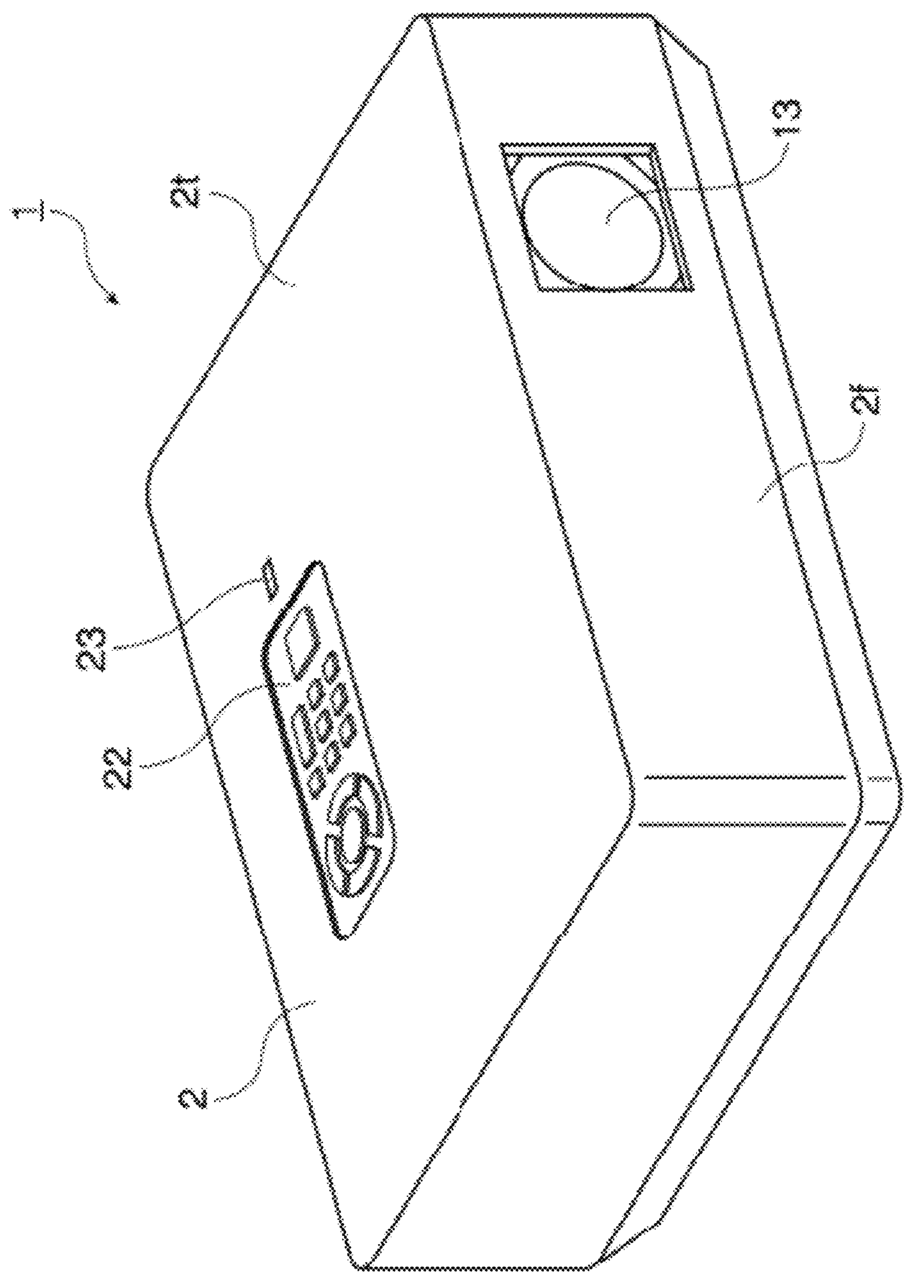
FIG. 1 is a perspective view of a projector as viewed from the front.
Figure 2:
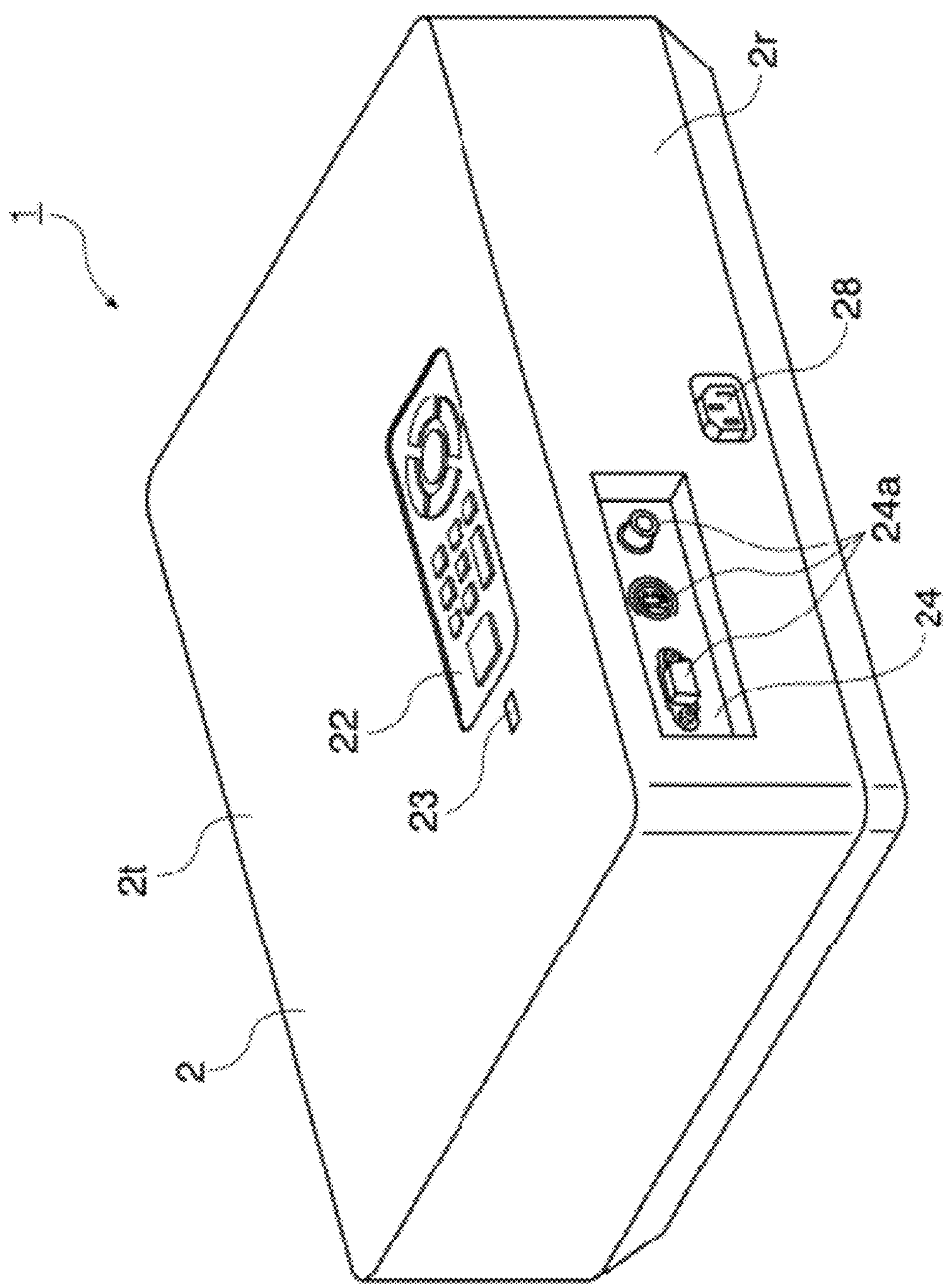
FIG. 2 is a perspective view of the projector as viewed from the rear.

FIGS. 1 and 2 are perspective views illustrating a projector according to this embodiment. FIG. 1 shows the projector as viewed from the front, and FIG. 2 shows the projector as viewed from the rear.

As illustrated in FIGS. 1 and 2, a projector 1 has an apparatus main body accommodated in a housing 2. A projection lens 13 for image projection is exposed on a front surface 2*f* of the housing 2. An input operation unit 22 for issuing various commands to the projector 1 is provided on an upper surface 2*t* of the housing 2. An LED display unit 23 for notifying the operation condition of the projector 1 is disposed in the vicinity of the input operation unit 22. A power source terminal 28 to which commercial power source is supplied, and an image information input unit 24 to which image information is inputted from a not-shown external image output device are equipped on a rear surface 2*r* of the housing 2. The image information input unit 24 has a plurality of input terminals 24*a*. One end of a cable is connected with the image output device, and the other end of the cable is connected with the input terminals 24*a*.

Figure 3:
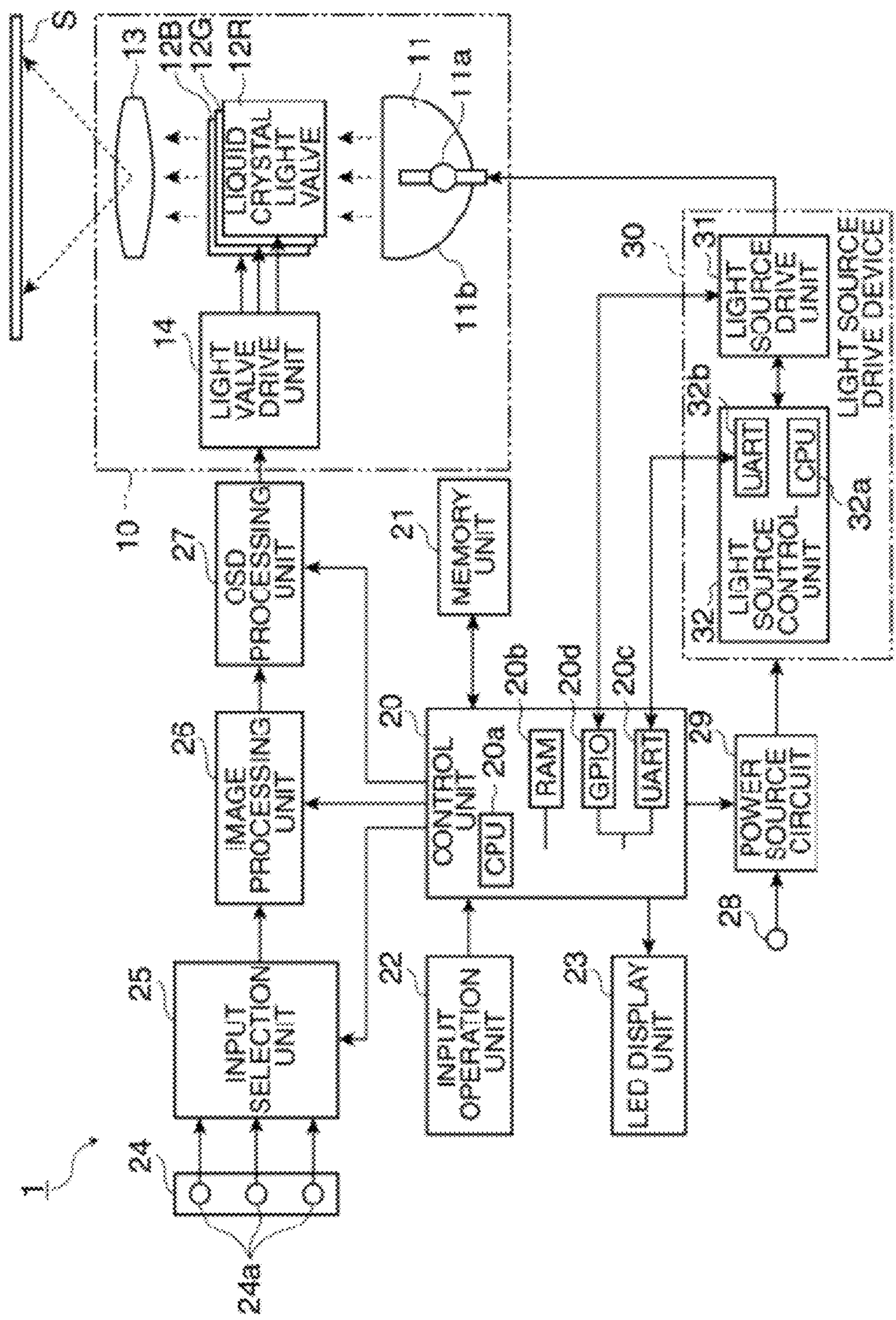
FIG. 3 is a block diagram showing a circuit structure of the projector.

FIG. 3 is a block diagram showing the circuit structure of the projector.

As shown in FIG. 3, the projector 1 includes an image projection unit 10, a control unit 20, a memory unit 21, the input operation unit 22, the LED display unit 23, the image information input unit 24, an input selection unit 25, an image processing unit 26, an OSD processing unit 27, the power source terminal 28, a power source circuit 29, a light source drive device 30, and other units.

The image projection unit 10 includes a light source 11, three liquid crystal light valves 12R, 12G, and 12B as light modulation devices, the projection lens 13 as projection system, a light valve drive unit 14, and other components. The image projection unit 10 corresponds to a display unit which forms images by modulating light emitted from the light source 11 by the function of the liquid crystal light valves 12R, 12G, and 12B, and projects the images through the projection lens 13 onto a projection surface S for display.

The light source 11 includes a discharge type light source lamp 11*a* constituted by extra-high pressure mercury lamp, metal halide lamp or the like, and a reflector 11*b* for reflecting light emitted from the light source lamp 11*a* toward the liquid crystal light valves 12R, 12G, and 12B. Light emitted from the light source 11 is converted into light having substantially uniform luminance distribution by a not-shown integrator system, and is divided into light components in three primary colors of red (R), green (G), and blue (B) by a not-shown color division system. Then, the respective color components enter the corresponding liquid crystal light valves 12R, 12G, and 12B.

Each of the liquid crystal light valves 12R, 12G, and 12B is constituted by a liquid crystal panel having a pair of transparent substrates between which liquid crystals are sealed, for example. Each of the liquid crystal light valves 12R, 12G, and 12B has plural pixels (not shown) arranged in matrix, and driving voltage can be applied to each of the pixels of the liquid crystals. When driving voltage corresponding to inputted image information is applied to the respective pixels by the light valve drive unit 14, light transmission rate corresponding to the image information is set for the respective pixels. Thus, light emitted from the light source 11 is modulated while passing through the liquid crystal light valves 12R, 12G, and 12B, and images corresponding to the image information are formed for respective color lights. The images formed for respective colors are combined for each pixel by a not-shown color combining optical system to form a color image. This color image is expanded and projected through the projection lens 13.

The control unit 20 includes a CPU (central processing unit) 20*a*, a RAM (random access memory) 20*b*, and further various types of interface circuit such as UART (universal asynchronous receiver transmitter) 20*c* and GPIO (general purpose input output) 20*d*. The control unit 20 operates according to a control program stored in the memory unit 21 to provide general control over the operation of the projector 1 while communicating with the respective units of the projector 1 via the interface circuits. Thus, the control unit 20 functions as a computer in cooperation with the memory unit 21. The control unit 20 may be constituted by a microprocessor including the CPU 20*a*, the RAM 20*b*, the interface circuits (UART 20*c* and GPIO 20*d*), and the like as one unit.

The memory unit 21 has non-volatile memories such as mask ROM (read only memory), flash memory, and FeRAM (ferroelectric RAM). The memory unit 21 stores the control program for controlling the operation of the projector 1, various setting data for specifying operation conditions and the like of the projector 1, and others.

The input operation unit 22 receives input operation from a user, and has plural operation keys through which the user gives various commands to the projector 1. The operation keys provided on the input operation unit 22 include a "power source key" for switching between ON and OFF of the power source, an "input switching key" for switching the effective input terminal 24*a*, a "menu key" for displaying a setting menu image on a projected image, and other keys. In response to operation of the operation keys of the input operation unit 22 by the user, the input operation unit 22 receives the input operation and outputs an operation signal corresponding to the operation of the user to the control unit 20. The input operation unit 22 may be constituted by a remote controller (not shown) operable by remote control. In this case, the remote controller transmits infrared light operation signal corresponding to the operation of the user, and a not-shown remote controller signal receiving unit receives the operation signal and transfers the operation signal to the control unit 20.

The LED display unit 23 is an indicator containing LED (light emitting diode) which notifies the user about the operation condition of the projector 1 (such as ON/OFF of power source and occurrence of abnormal condition) by switching the display condition of the LED display unit 23 according to a command from the control unit 20. The LED display unit 23 switches the display condition, that is, switches between lighting, flickering, turned-off, light emission and the like to display a number of operation conditions.

The image information input unit 24 has the plural input terminals 24*a* as described above. The image information outputted from the external image output device such as video reproduction device and personal computer is inputted to the input terminals 24*a* via the cable. The image information inputted to the respective input terminals 24*a* is supplied to the input selection unit 25.

The input selection unit 25 selects one of the input terminals 24*a* corresponding to the command from the control unit 20, and outputs the image information inputted to the selected input terminal 24*a* to the image processing unit 26. When the user specifies the desired input terminal 24*a* by operating the input switching key provided on the input operation unit 22, the control unit 20 allows the input selection unit 25 to output the image information inputted to the corresponding input terminal 24*a* to the image processing unit 26.

The image processing unit 26 converts image information having various forms at the time of input from the input selection unit 25 into image information representing gradations of the respective pixels on the liquid crystal light valves 12R, 12G, and 12B. The converted image information is provided for each of the color lights R, G and B, and is constituted by plural pixel values associated with all of the pixels on the liquid crystal light valves 12R, 12G, and 12B. The pixel values determine light transmission rates of corresponding pixels to specify intensities (gradations) of lights released from the respective pixels. In addition, the image processing unit 26 performs image quality controlling process and the like for controlling brightness, contrast, sharpness, hue, and other conditions contained in the converted image information, and outputs the processed image information to the OSD processing unit 27.

The OSD processing unit 27 performs process for superposing OSD (on screen display) images such as setting menu image and message image on an image to be projected (projection image). The OSD processing unit 27 includes not-shown OSD memory, and stores image data showing figures and fonts and the like for forming OSD images. When OSD image superposition request is issued from the control unit 20, the OSD processing unit 27 reads necessary image data from the OSD memory and produces OSD image information for forming the specified OSD image. Then, the OSD processing unit 27 combines this OSD image information with image information inputted from the image processing unit 26 such that the OSD image can be superposed on the projection image at a predetermined position. The image information combined with the OSD image information is outputted to the light valve drive unit 14. When OSD image superposition request is not issued from the control unit 20, the OSD processing unit 27 outputs the image information inputted from the image processing unit 26 to the light valve drive unit 14 as it is.

When operated by the light valve drive unit 14 according to image information inputted from the OSD processing unit 27, the liquid crystal light valves 12R, 12G, and 12B form images corresponding to the image information as images to be projected through the projection lens 13.

The power source circuit 29 receives commercial power source such as AC 100V from the outside through the power source terminal 28. The power source circuit 29 converts commercial power source (AC power source) into DC power source having predetermined voltage to supply power to the respective units of the projector 1. In addition, the power source circuit 29 switches between condition of supplying power necessary for image projection (operation power) to the respective units (power source ON condition) and condition of stopping supply of operation power and waiting for operation of turning on the power source (standby condition) based on the command from the control unit 20.

The light source drive device 30 has a light source drive unit 31 for actuating the light source 11, and a light source control unit 32 for controlling operation of the light source drive unit 31. The light source drive unit 31 includes an inverter (not shown) for converting DC current produced by the power source circuit 29 into AC rectangular wave current, an igniter (not shown) for urging the light source lamp 11*a* to start by causing insulation break between electrodes of the light source lamp 11*a*, and other components. The light source drive unit 31 starts the light source 11 and supplies predetermined power to the light source 11 to turn on the light source 11. Moreover, the light source drive unit 31 turns off the light source 11 by stopping power supply, and switches between two levels of high-luminance and low-luminance as the light emission luminance of the light source 11 by controlling power (waveform) to be supplied. Furthermore, the light source drive unit 31 can detect the lighting condition (whether turned-on or turned-off condition) and the light emission luminance of the light source 11 based on current consumed by the light source 11, voltage applied to the light source 11 or the like, and outputs the detection result to the light source control unit 32.

The light source control unit 32 is a microprocessor including the CPU 32*a* and others, for example, and contains the interface circuit (UART 32*b*) for providing serial communication (UART communication) between the light source control unit 32 and the UART 20*c* of the control unit 20. The light source control unit 32 controls operation of the light source drive unit 31 based on a control command inputted from the control unit 20 through the UART communication, and outputs response data corresponding to the control result to the control unit 20 through the UART communication.

The light source drive unit 31 is connected with both the GPIO 20*d* of the control unit 20 and the light source control unit 32. A part of the operation of the light source drive unit 31 is controlled by the control unit 20, and the other part of the operation is controlled via the light source control unit 32. For example, for turning on and off the light source 11, the control unit 20 controls the light source drive unit 31. The control unit 20 allows the light source drive unit 31 to turn on or turn off the light source 11 by setting an output port (output terminal) provided on the GPIO 20*d* in predetermined potential condition and outputting control information to the light source drive unit 31.

On the other hand, detection of light emission luminance switching and lighting condition of the light source 11 is controlled by the light source control unit 32. When the user executes input operation for switching light emission luminance through the input operation unit 22, the control unit 20 outputs control command requesting light emission luminance switching to the light source control unit 32 through the UART communication. When receiving the control command, the light source control unit 32 allows the light source drive unit 31 to perform light emission luminance switching operation, and allows the light source drive unit 31 to detect light emission luminance for determining whether light emission luminance switching has been conducted in normal condition or not. Then, the light source control unit 32 outputs response data corresponding to the detection result to the control unit 20 through the UART communication.

When the control unit 20 outputs control command requesting lighting condition detection to the light source control unit 32 through the UART communication, the light source control unit 32 allows the light source drive unit 31 to detect lighting condition and outputs response data corresponding to the detection result to the control unit 20. Though not shown in the figure, the light source drive unit connects with various detection units for monitoring voltages, currents, temperatures and the like at predetermined parts. Thus, the control unit 20 can obtain detection results of these parts by outputting predetermined control commands to the light source control unit 32 through the UART communication. Accordingly, various controls can be performed by the light source control unit 32 through the UART communication compared with a structure performing control by the GPIO 20*d*, and detection results and the like can be obtained with high accuracy.

According to the projector 1 in this embodiment, control over apart of operation of the light source drive unit 31 by the light source control unit 32 through the UART communication (such as light emission luminance switching and lighting condition detection discussed above) can be switched to direct control by the GPIO 20*d* when abnormal condition is produced in the UART communication or when normal control cannot be performed due to malfunction of the light source control unit 32 or the like. Thus, the output port of the GPIO 20*d* has connection for issuing commands of light emission luminance switching and lighting condition detection to the light source drive unit 31, and the input port of the GPIO 20*d* has connection for inputting responses corresponding to control results (detection results) from the light source drive unit 31.

Figure 4:
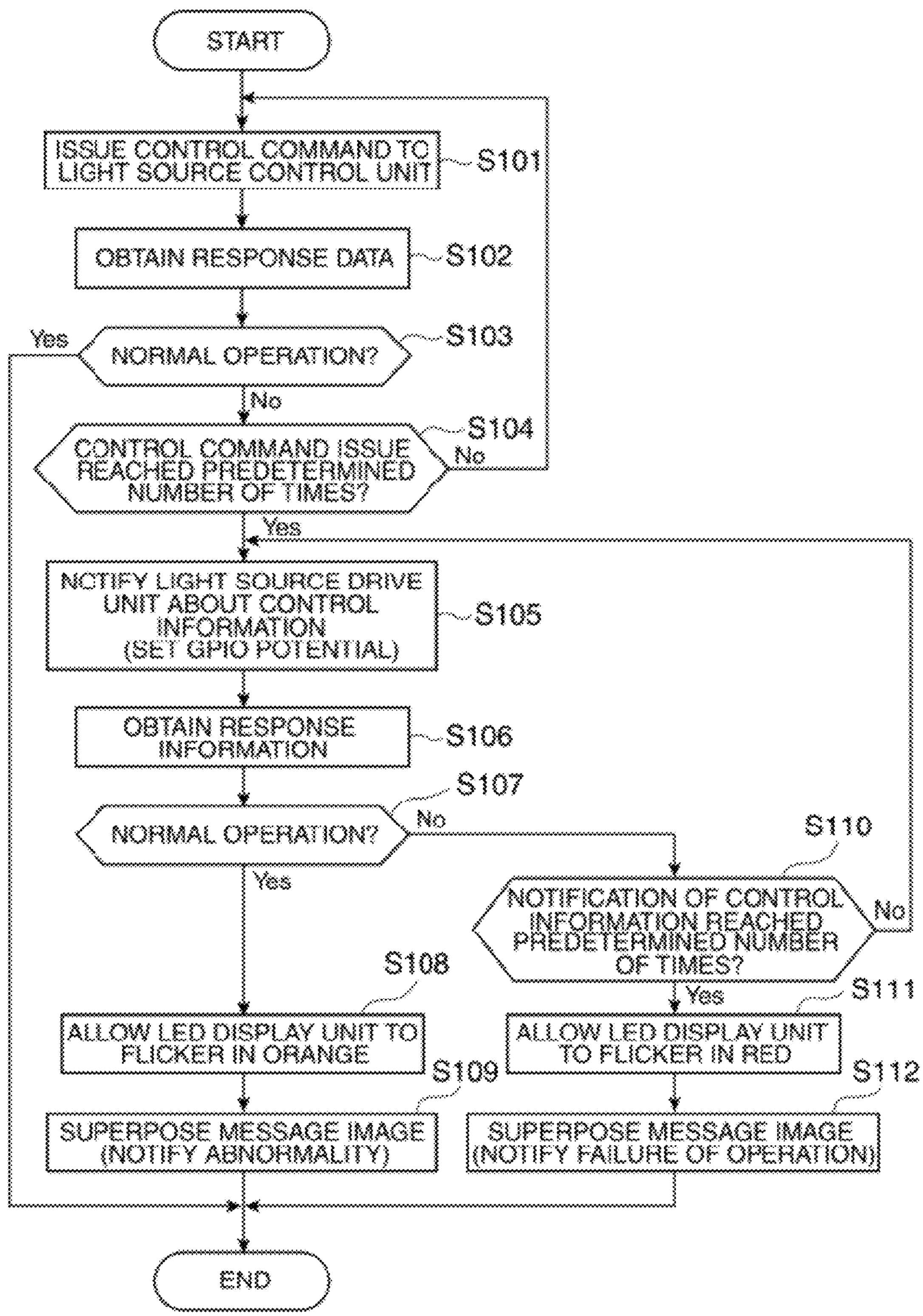
FIG. 4 is a flowchart showing operation of the projector performed when controlling a light source drive unit.

FIG. 4 is a flowchart showing the operation of the projector 1 performed when controlling the light source drive unit 31. When the user operates the menu key on the input operation unit 22 to superpose the setting menu image and then requests light emission luminance switching by predetermined input operation, for example, the control unit 20 operates according to the flowchart shown in FIG. 4.

As show in FIG. 4, the control unit 20 initially issues (outputs) control command requesting light emission luminance switching (luminance switching command) to the light source control unit 32 through the UART communication in step S101. The light source control unit 32 having received the luminance switching command from the control unit 20 allows the light source drive unit 31 to execute light emission luminance switching operation, and then outputs the response data discussed above to the control unit 20 through the UART communication.

In step S102, the control unit 20 obtains response data outputted from the light source control unit 32. In step S103, the control unit 20 determines whether the operation corresponding to the issued control command, i.e., light emission luminance switching has been carried out in normal condition. When it is determined that light emission luminance switching has been normally performed, the flow ends. When it is determined that light emission luminance switching has not been normally performed, that is, when the control unit 20 receives response data which shows that light emission luminance is not switched, or when the control unit 20 cannot receive response data itself, the flow goes to step S104.

When the flow shifts to step S104 without achieving normal switching of light emission luminance, the control unit determines whether the number of times of luminance switching command issue has reached a predetermined number of times. When it is determined that the number of times of issue has reached the predetermined number, the flow goes to step S105. When it is determined that the number of times of issue is smaller than the predetermined number, the flow returns to step S101 to again issue the luminance switching command. That is, the control unit 20 repeatedly issues the luminance switching command to the light source control unit 32 until light emission luminance is switched in normal condition, and shifts to step S105 when light emission luminance is not switched in normal condition even after the predetermined number of times of luminance switching command issue. The number of times of luminance switching command issue is stored in the RAM 20*b* of the control unit 20, for example. The control unit 20 resets the number of times of luminance switching command issue to zero when starting this flow, and increments the number of times by one every time the control unit 20 issues luminance switching command in step S101.

When the flow goes to step S105 without achieving light emission luminance switching in normal condition even after repeating luminance switching command issue the predetermined number of times, the control unit 20 switches the control to direct control by the GPIO 20*d*. More specifically, the control unit 20 gives (outputs) control information for requesting light emission luminance switching (luminance switching request) to the light source drive unit by setting the output port of the GPIO 20*d* in the predetermined potential condition. The light source drive unit 31 having received the luminance switching request executes light emission luminance switching operation, and detects light emission luminance to determine whether light emission luminance has been switched in normal condition. Then, the control unit 20 outputs the detection result as response information to the GPIO 20*d* (input port) of the control unit 20.

In step S106, the control unit 20 obtains the response information outputted from the light source drive unit 31, i.e., the light emission luminance detection result produced by the light source drive unit 31. More specifically, the control unit 20 recognizes the response information based on the potential condition of the input port of the GPIO 20*d*.

In subsequent step S107, the control unit 20 determines based on the response information whether the operation corresponding to the notified control information, i.e., light emission luminance switching, has been performed in normal condition. When it is determined that light emission luminance has been normally switched, the flow goes to step S108. When light emission luminance is not switched in normal condition, the flow goes to step S110.

Figure 5:
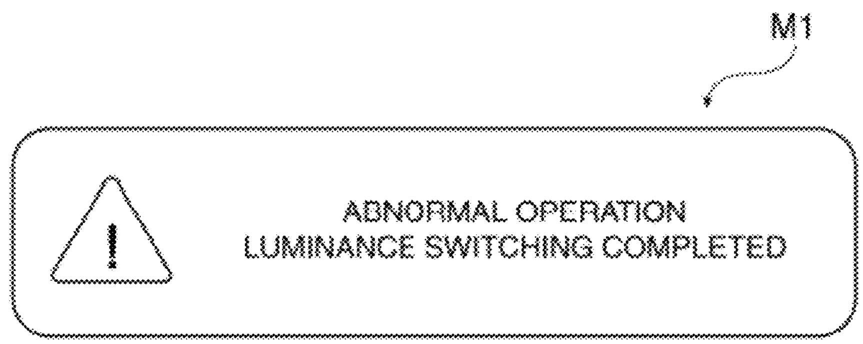
FIG. 5 shows a message image.

When the flow goes to step S108 after achieving light emission luminance switching in normal condition, the control unit 20 causes the LED display unit 23 to flicker in orange for a predetermined time as notification that luminance switching control by UART communication has not been performed in normal condition. In subsequent step S109, the control unit 20 allows the OSD processing unit 27 to display a message image M1 (see FIG. 5) as notification that abnormal condition has been produced in the projector 1 on the projection image for a predetermined time. Then, the flow ends.

When the flow goes to step S110 without achieving light emission luminance switching in normal condition, the control unit 20 determines whether the number of times of luminance switching request notification has reached a predetermined number of times. When it is determined that the number of times has reached the predetermined number, the flow shifts to step S111. When it is determined that the number of times is smaller than the predetermined number, the control unit 20 resets the potential condition of the output port of the GPIO 20*d*. Then, the control unit 20 returns to step S105 to again give notification of luminance switching request. That is, the control unit 20 repeatedly gives notification of luminance switching request to the light source drive unit 31 until light emission luminance is switched in normal condition, and shifts to step S111 when light emission luminance is not switched in normal condition even after the predetermined times of luminance switching request notification. The number of times of luminance switching request notification is stored in the RAM 20*b* of the control unit 20, for example. The control unit 20 resets the number of times of luminance switching request notification to zero when starting this flow, and increments the number of times by one every time the control unit 20 gives notification of luminance switching request in step S105.

Figure 6:
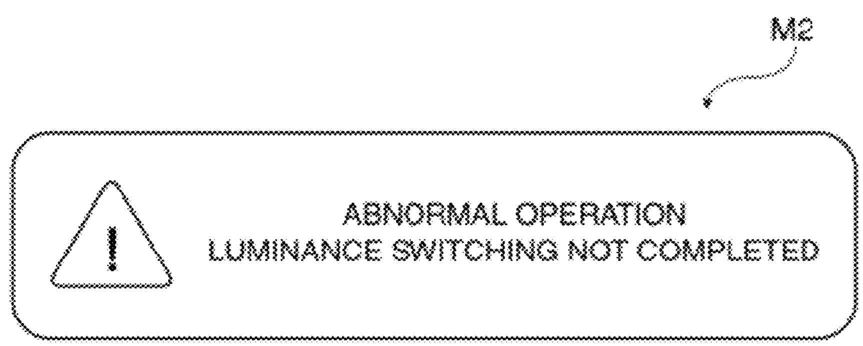
FIG. 6 shows a message image.

When the flow goes to step S111 without achieving light emission luminance switching in normal condition even after repeat of the luminance switching request notification the predetermined number of times, the control unit 20 causes the LED display unit 23 to flicker in red for a predetermined time as notification that light emission luminance switching both by UART communication and by direct control is not achieved. In subsequent step S112, the control unit 20 allows the OSD processing unit 27 to display a message image M2 (see FIG. 6) as notification that abnormal condition has been produced in the projector 1 and that light emission luminance switching operation has not been performed in the normal condition on the projection image for a predetermined time. Then, the flow ends.

The user can continuously use the projector 1 even after display of the message images M1 and M2 as long as other serious abnormal condition (such as abnormality of high temperature) is not produced. When the message images M1 and M2 are frequently displayed, the projector 1 is inspected or repaired at a shop dealing with the projector 1 or the like.

The operation of the projector 1 performed when detecting lighting condition of the light source 11 by the light source drive unit 31 is now explained.

At the time of detection of the lighting condition, the control unit 20 operates according to the flow similar to that executed at the time of light emission luminance switching (see FIG. 4). The detection of the lighting condition is performed when checking whether normal lighting condition has been achieved after turning on the light source 11 by controlling the light drive unit 31 under the control of the control unit 20, when checking light source OFF due to the end of the life of the light source lamp 11*a* or the like, or in other cases.

Initially, the control unit 20 issues control command requesting detection of lighting condition (lighting detection command) to the light source control unit 32 through the UART communication (step S101). The light source control unit 32 having received the lighting detection command from the control unit 20 allows the light source drive unit 31 to perform lighting condition detection operation, and then outputs response data corresponding to the detection result to the control unit 20 through the UART communication.

Then, the control unit 20 obtains the response data inputted from the light source control unit 32 (step S102), and determines whether lighting condition detection has been executed in normal condition based on the response data (step S103). When receiving the response data showing turned-on or turned-off of the light source 11, for example, the control unit 20 determines that the lighting condition detection has been normally conducted. When receiving other response data or receiving no response data, the control unit determines that the lighting condition detection has not been normally conducted. When it is confirmed that lighting condition detection has been carried out in normal condition, the flow ends.

When lighting condition detection is not performed in normal condition even after issue of the lighting detection command, the control unit 20 determines whether the number of times of lighting detection command issue has reached a predetermined number of times (step S104). Then, the control unit 20 repeats lighting detection command issue to the light source control unit 32 (step S101) until lighting condition detection is executed in normal condition.

When lighting condition detection is not performed in normal condition even after the predetermined number of times of lighting detection command issue, the control unit 20 switches the control to direct control by the GPIO 20*d*. More specifically, the control unit 20 gives notification of control information for requesting lighting condition detection (lighting detection request) to the light source drive unit 31 by setting the output port of the GPIO 20*d* in predetermined potential condition (step S105). The light source drive unit 31 having received the lighting detection request executes lighting condition detection operation, and outputs the detection result as response information to the GPIO 20*d* (input port) of the control unit 20.

Then, the control unit 20 obtains the response information outputted from the light source drive unit 31, i.e., the lighting condition detection result from the light source drive unit 31 (step S106), and determines whether the lighting condition detection has been carried out in normal condition based on the response information (step S107).

Figure 7:
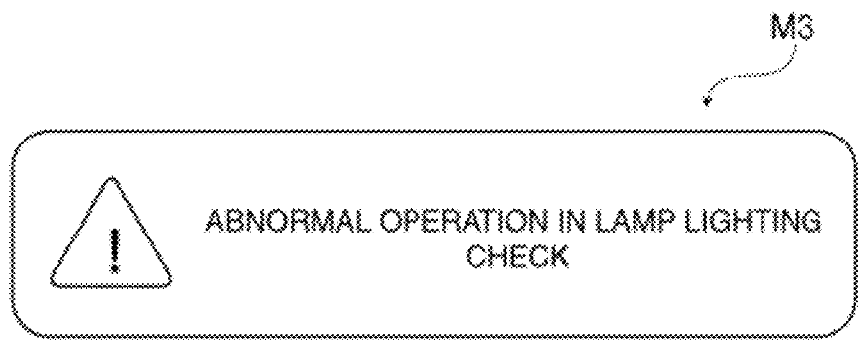
FIG. 7 shows a message image.

When it is determined that the lighting condition detection has been normally conducted, the control unit 20 causes the LED display unit 23 to flicker in orange for a predetermined time as notification that the lighting condition detection control has not been performed in normal condition through the UART communication (step S108). Then, the control unit 20 allows the OSD processing unit 27 to display a message image M3 (see FIG. 7) as notification that abnormal condition has been produced in the projector 1 on the projection image for a predetermined time (step S109).

When it is determined that the lighting condition detection has not been performed in normal condition, the control unit 20 determines whether the number of times of lighting detection request notification has reached a predetermined number of times (step S110). Then, the control unit 20 repeats lighting detection request notification to the light source drive unit 31 until the lighting condition detection is carried out in normal condition (step S105).

Figure 8:
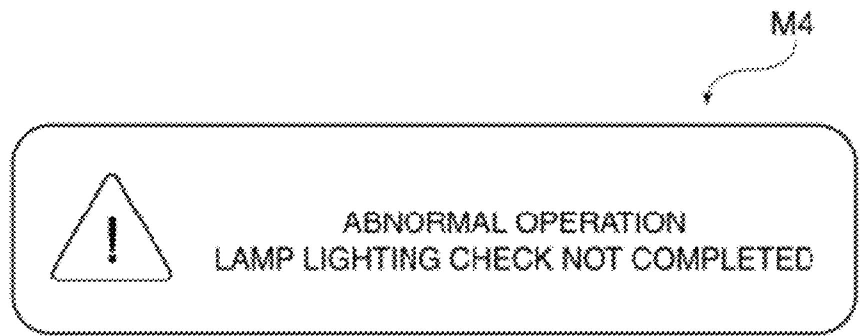
FIG. 8 shows a message image.

When it is determined that the lighting condition detection has not been normally performed even after the predetermined number of times of lighting condition detection request notification, the control unit 20 causes the LED display unit 23 to flicker in red for a predetermined time as notification that the lighting condition detection has not been normally executed both by the UART communication and by the direct control (step S111). Then, the control unit 20 allows the OSD processing unit 27 to display a message image M4 (see FIG. 8) as notification that abnormal condition has been produced in the projector 1 and that lighting condition detection has not been performed in normal condition on the projection image for a predetermined time (step S112). When the lighting condition detection is not conducted in normal condition, there is a possibility that the light source 11 has not been turned on. In this case, the user cannot visually check the message image M4, but can recognize the abnormal condition of the projector 1 by the display condition of the LED display unit 23.

Similarly to light emission luminance switching, the user can continuously use the projector 1 even after display of the message images M3 and M4 as long as other serious abnormal condition (such as abnormality of high temperature) is not produced. However, when lighting condition needs to be frequently detected for the purpose of detection of OFF condition of the light source during projection or the like, images cannot be observed in some cases by the message images M3 and M4 overlapped every time abnormal condition is caused. Thus, the message images M3 and M4 may be superposed only when steps S109 and S112 are initially performed after starting the projector 1 and turning on the light source 11. Alternatively, the message images M3 and M4 may be superposed once for plural number of times of abnormal condition occurrence or once for a predetermined period.

As explained above, the projector 1 according to this embodiment can provide the following advantages.

(1) According to the projector 1 in this embodiment, for the control over the light source drive unit 31, the control unit 20 controls the light source drive unit 31 by using the GPIO 20*d* when control via the UART communication, i.e., control via the light source control unit 32 is not conducted in normal condition. Thus, the control unit 20 can allow the light source drive unit 31 to perform normal operation even when abnormality is produced in the UART communication, when faulty operation is caused by the light source control unit 32, or in other cases.

(2) According to the projector 1 in this embodiment, occurrence of abnormal condition is notified by the LED display unit 23 and the message images M1 through M4 when control by the UART communication, i.e., control in response to the control command is not normally carried out. Thus, the user can recognize that abnormal condition has been produced in the projector 1.

(3) According to the projector 1 in this embodiment, the light source drive unit 31 outputs the control result (response information) to the control unit 20 when the light source drive unit 31 is controlled by the control unit 20. Thus, the control unit 20 can determine whether the direct control has been conducted in normal condition, and performs operations different according to the control result. In this embodiment, the display condition of the LED display unit 23 and the contents of the superposed message images M1 through M4 are varied according to the case when the direct control has been normally executed and when the direct control has not been normally executed.

(4) According to the projector 1 in this embodiment, communication between the control unit 20 and the light source control unit 32 is provided by serial communication (URAT communication). Thus, various controls can be performed over the light source 11, and detection results and the like can be obtained with high accuracy without using a number of wires between the control unit 20 and the light source control unit 32.

In this embodiment, the UART 20*c* provided on the control unit 20 corresponds to a first communication unit, and the GPIO 20*d* of the control unit 20 corresponds to a second communication unit. The LED display unit 23 lighting or flickering in steps S108 and S111, the OSD processing unit 27 used when the message images M1 through M4 are superposed (steps S109 and S112), and the control unit 20 controlling these operations correspond to a notification unit.

Modified Examples

The embodiment described above can be modified in the following manners.

According to this embodiment, two cases of light emission luminance switching and lighting condition detection have been discussed. However, the flow can be applied to other operations of the light source drive unit 31. For example, control over turning on and turning off the light source 11 may be performed by the light source control unit 32 through the UART communication in ordinary condition, and may be performed by the GPIO 20*d* when normal control cannot be provided.

According to this embodiment, the operation of the projector 1 can be continued even when normal operation cannot be achieved both by the control through the UART communication and by the direct control using the GPIO 20*d*. In this case, there is a possibility that some abnormality has been produced in the light source drive unit 31, the light source 11 or other parts. Thus, the power source may be turned off or notification for urging the user to turn off the power source (standby condition) may be given to the user at that time.

According to this embodiment, notifications of both the LED display unit 23 and the message images M1 through M4 are given to the user when the control over the light source drive unit 31 cannot be performed in normal condition. However, only either one of these notifications may be given. The method of notification is not limited to the LED display unit 23 and the message images M1 through M4. For example, notification by audio may be used.

According to this embodiment, the light source drive unit 31 detects lighting condition (whether turned on or not) and light emission luminance of the light source 11 based on current consumed by the light source 11 and voltage applied to the light source 11, and the like. However, the method of detecting the lighting condition and light emission luminance of the light source 11 may be other methods such as detection by photo-sensor and the like.

According to this embodiment, the three-plate-type projector 1 including the three liquid crystal light valves 12R, 12G, and 12B as light modulation devices has been explained but the embodiment is not limited to this. For example, one liquid crystal light valve containing sub pixel transmitting R light, G light, and B light in each pixel may be employed for forming images.

According to this embodiment, the transmission-type liquid crystal light valves 12R, 12G, and 12B are used as light modulation devices. However, reflection-type light modulation devices such as reflection-type liquid crystal light valves may be used. Also, micromirror array device capable of modulating light emitted from a light source by controlling emission direction of entering light for each micromirror as pixel may be employed, for example.

According to this embodiment, the light source 11 is constituted by the discharge-type light source lamp 11*a*. However, solid light source such as LED (light emitting diode) light source, and other types of light source may be used.

What is claimed is:

1. A projector which modulates light emitted from a light source and projects the modulated light, comprising:

a light source drive device which includes a light source drive unit for driving the light source and a light source control unit for controlling operation of the light source drive unit; and a control unit which includes a first communication unit connected with the light source control unit and a second communication unit connected with the light source drive unit, and allows the light source control unit to control operation of the light source drive unit by outputting a control command from the first communication unit, wherein the light source control unit:

controls operation of the light source drive unit based on the control command, receives, from the light source drive unit, at least one of a light emission luminance and a lighting condition of the light source detected by the light source drive unit, and outputs, to the control unit, a response corresponding to the at least one of the light emission luminance and the lighting condition of the light source, and wherein the control unit:

determines whether the light source control unit has normally controlled the operation of the light source drive unit in accordance with the control command based on the response received from the light source control unit, and outputs control information from the second communication unit to directly control the light source drive unit when it is determined that the light source control unit has not normally controlled the operation of the light source drive unit.

2. The projector according to claim 1, wherein the control unit controls the light source drive unit at least to turn off the light source by the second communication unit when it is determined that the light source control unit has not normally controlled the operation of the light source drive unit.

3. The projector according to claim 1, further comprising a notification unit which notifies occurrence of abnormality when it is determined that the light source control unit has not normally controlled the operation of the light source drive unit.

4. The projector according to claim 1, wherein the light source drive unit outputs, to the control unit, the response corresponding to the at least one of the light emission luminance and the lighting condition of the light source when the light source drive unit is controlled by the control unit.

5. The projector according to claim 1, wherein communication between the first communication unit and the light source control unit is serial communication.

6. A control method of a projector which includes an image projection unit for modulating light emitted from a light source and projecting the modulated light, a light source drive unit for driving the light source, and a light source control unit for controlling operation of the light source drive unit, the control method comprising:

outputting a control command to the light source control unit and allowing the light source control unit to control operation of the light source drive unit based on the control command;

obtaining, from the light source control unit, a response corresponding to at least one of a light emission luminance and a lighting condition of the light source, the at least one of the light emission luminance and the lighting condition of the light source being detected by the light source drive unit;

determining whether the light source control unit has normally controlled the operation of the light source drive unit in accordance with the control command based on the response received from the light source control unit; and controlling the light source drive unit by directly outputting control information to the light source drive unit when it is determined that the light source control unit has not normally controlled the operation of the light source drive unit.

7. A projector which modulates light emitted from a light source and projects the modulated light, comprising:

a light source drive unit for driving the light source;

a light source control unit for controlling operation of the light source drive unit; and a control unit which includes a universal asynchronous receiver transmitter ("UART") unit connected with the light source control unit and general purpose input output ("GPIO") unit connected with the light source drive unit, and allows the light source control unit to control operation of the light source drive unit by outputting a control command from the UART unit, wherein:

the control unit determines whether the light source control unit normally controls operation of the light source drive unit in accordance with the control command based on a response received from the light source control unit, the response corresponding to at least one of a light emission luminance and a lighting condition of the light source, the at least one of the light emission luminance and the lighting condition of the light source being detected by the light source drive unit, and the control unit directly controls operation of the light source drive unit using the GPIO unit when it is determined that the light source drive unit is not controlled normally by the light source control unit connected to the control unit via the UART unit.

8. The projector according to claim 7, wherein the control unit controls the light source drive unit to change light emission luminance of the light source, and receives light source condition detected by the light source drive unit, the light source condition being received from the light source drive unit.

9. The projector according to claim 7, wherein the control unit controls operation of the light source drive unit using the GPIO unit when abnormality is produced in the UART communication or when faulty operation is caused by the light source control unit.

* * * * *